United States Patent [19]

Norlander et al.

[11] 4,298,079
[45] Nov. 3, 1981

[54] ROTARY DRILL BIT

[75] Inventors: Gösta Norlander, Surte, Sweden; Angelo Vignotto; Mario Micca, both of Turin, Italy

[73] Assignees: Sandvik Aktiebolag, Sandviken; Aktiebolaget SKF, Göteborg, both of Sweden

[21] Appl. No.: 136,351

[22] Filed: Apr. 1, 1980

[30] Foreign Application Priority Data

Mar. 28, 1979 [SE] Sweden ............................ 7902763

[51] Int. Cl.³ .................... E21B 10/18; E21B 10/22; F16J 15/32
[52] U.S. Cl. .................................... 175/339; 175/372; 277/88; 277/94; 308/8.2
[58] Field of Search .................. 308/8.2; 277/88, 92, 277/94; 175/371, 372, 359, 339, 337

[56] References Cited

U.S. PATENT DOCUMENTS

| | | | |
|---|---|---|---|
| 1,945,240 | 1/1934 | Tupica | 175/337 |
| 3,096,835 | 7/1963 | Neilson | 175/372 X |
| 3,193,028 | 7/1965 | Radzimovsky | 175/372 |
| 3,199,878 | 8/1965 | Cunningham et al. | 175/371 X |
| 3,244,459 | 4/1966 | Ortloff | 175/372 X |
| 3,862,762 | 1/1975 | Millsap | 175/371 X |
| 4,183,417 | 1/1980 | Levefelt | 175/339 |

Primary Examiner—Stephen J. Novosad
Attorney, Agent, or Firm—Burns, Doane, Swecker & Mathis

[57] ABSTRACT

A rotary roller bit comprising at least one rotatably carried roller cutter (12) and provided with sealing means (21) for preventing impurities from entering into the bearing system (14, 15, 16,) of the roller cutter. For purposes of preventing axial and wobbling movements of the roller cutter (12) relative to the bit head from creating high contact pressure at the contact surface between the sealing means (21) and the surface against which same seals the sealing means (21) is provided with an elastically yieldable tongue (25) which extends radially relative to the rotational axis of the roller cutter (12).

15 Claims, 4 Drawing Figures

ROTARY DRILL BIT

The present invention relates to a rotary roller bit of the type comprising at least one roller cutter which is rotatably carried on a bearing shaft over bearing means. An annular sealing means is disposed in an annular gap between the bit head and the roller cutter for sealing the bearing means.

Roller bits of the above type are subjected to extreme stresses which cause complex movements of the roller cutter relative to the bit head. These movements, which increase when wear of the bearing means takes place, comprise a component which is directed along the rotational axis of the roller cutter and a wobbling movement of the roller cutter relative to the bearing shaft.

In previously known rotary roller bits of the type defined in the prior art portion of claim 1 the sealing means are of comparatively strong and stiff construction so as to prevent entry of impurities into the bearing means merely by its strength.

Large axial and wobbling movements of the roller cutter relative to the bit head cause high contact pressure at the sealing surface which produces high heat generation and rapid wear of the sealing means.

The object of the invention is to provide a rotary roller bit wherein the contact pressure at the sealing surface of the sealing means is low even in cases where large axial and wobbling movements of the roller cutter relative to the bit head occur.

Another object of the invention is to continuously remove impurities from the side of the sealing means turned away from the sealing surface thereof in order to decrease the resistance against the yielding movement of the sealing means.

A further object of the invention is to provide the sealing means with a secondary sealing function which works as an emergency seal if the primary sealing function is destroyed.

A still further object of the invention is to provide a lubricant reservoir between the two sealing functions for purposes of lubricating the primary sealing function.

The above and other objects are attained by giving the invention the characterizing features stated in the claims following hereinafter.

The invention is described in detail in the following description with reference to the accompanying drawings in which one embodiment is shown by way of example. It is to be understood that this embodiment is only illustrative of the invention and that various modifications thereof may be made within the scope of the claims following hereinafter.

In the drawings, FIG. 1 shows in section a roller cutter and the bearing shaft associated therewith in a rotary roller bit according to the invention.

Figure 1:
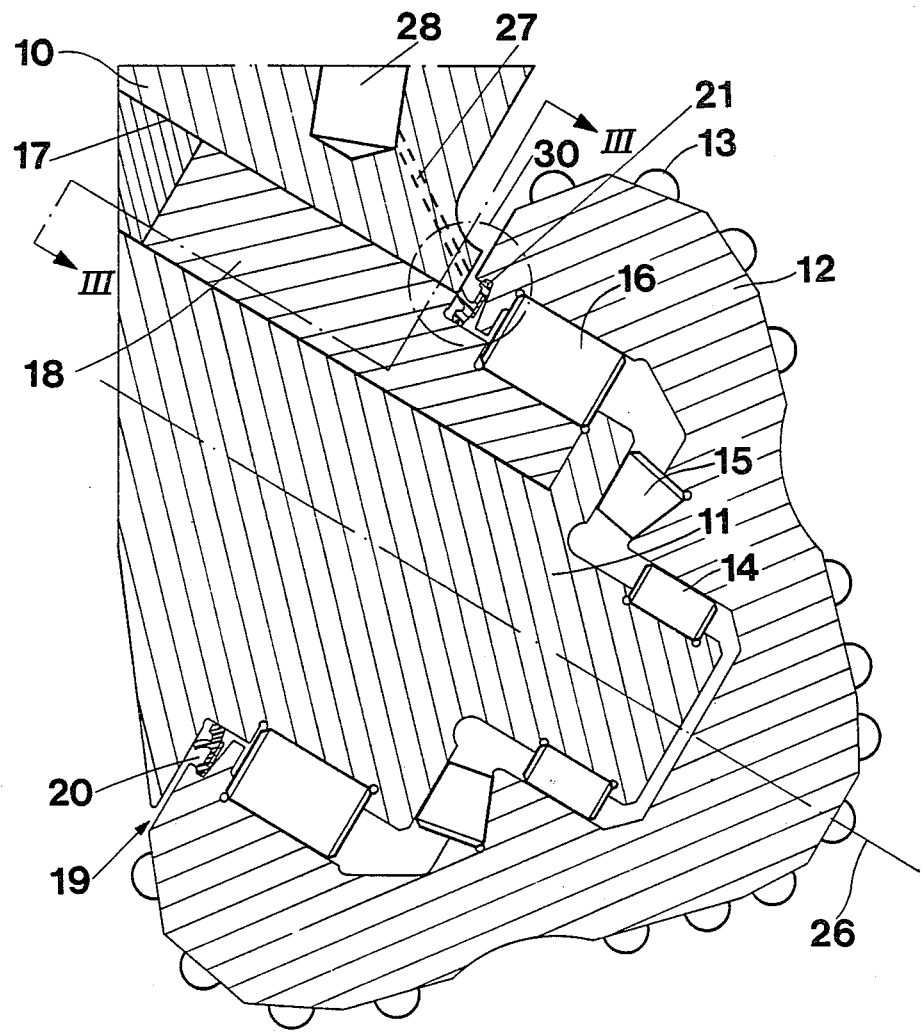
Figure 2:
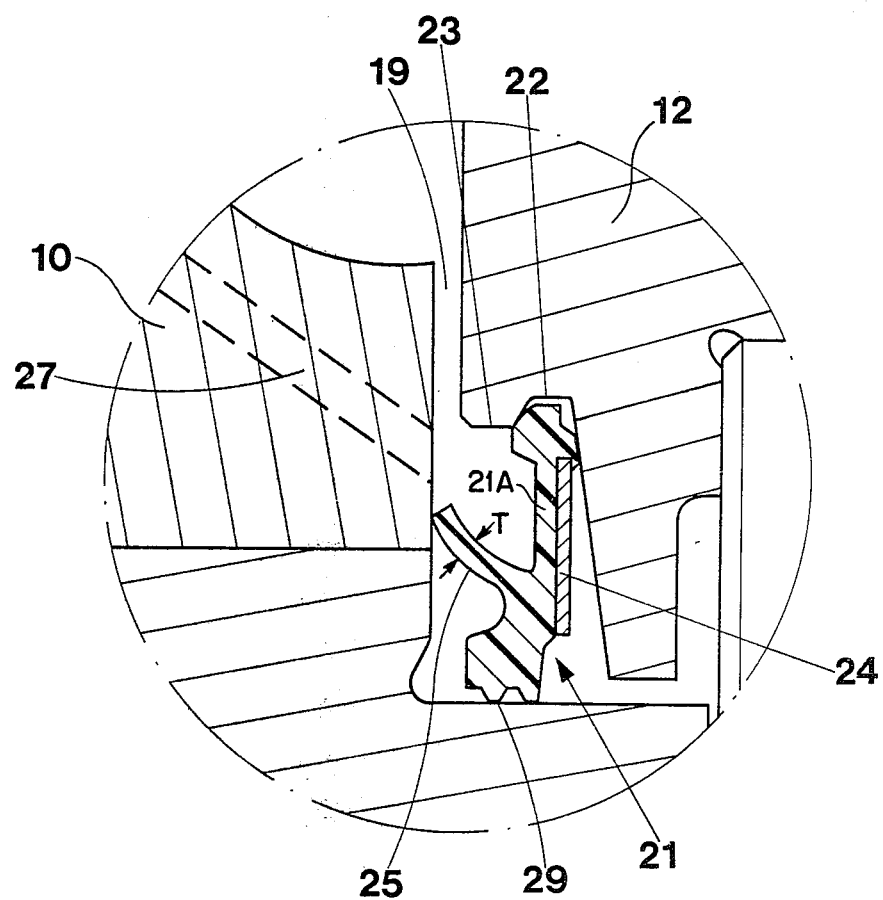
FIG. 2 shows in an enlarged scale the encircled part in FIG. 1.

FIG. 1 shows a roller bit for rotary drilling in rock and earth formations. The rotary roller bit comprises in conventional manner three separate legs which form part of a bit head. A roller bit of this type is disclosed in Swedish patent specification No. 7706480-6. For the sake of clarity only one leg 10 is shown in FIG. 1. The lowermost portion of the leg 10 is formed as a bearing shaft 11 upon which a roller cutter 12 is rotatably carried. The roller cutter 12 is provided with cutting means 13, in the illustrated embodiment hard metal inserts which are press-fitted in corresponding holes in the roller cutter, so as to break up and crush rock and earth formations when the bit is rotated and moved downwards the hole being drilled.

The bearing means for the rotatable supporting of the roller cutter 12 comprises a roller bearing 14, a conical thrust roller bearing 15 and a roller bearing 16. The roller cutter 12 is retained on the bearing shaft 11 by means of the roller bearing 16. During assembling of the roller bit the roller cutter 12 together with the roller bearings 14, 15 are first mounted on the bearing shaft 11, whereupon the separate rollers in the roller bearing 16 are inserted through a loading bore 17, whereafter a pin 18 is inserted into the bore 17 and secured therein by welding. Preferably, the bearing system is lubricated by means of a lubricating system, not shown, which in conventional manner comprises a pressure compensator for equalizing the pressures in the lubricant and the fluid in the drill hole.

An annular gap or clearance 19 is formed between the roller cutter 12 and the leg 10. At its radially innermost end the gap 19 terminates into an annular chamber 20, which has a larger axial extent than the gap 19. A sealing means, generally denoted by 21, is mounted in the chamber 20 for preventing impurities, such as drilling dust, from entering into the bearing system through the gap 19.

The sealing means 21 is attached along its readily outermost end in an annular groove 22 in the roller cutter 12. The sealing means 21 has an outer diameter which is somewhat larger than the inner diameter of a shoulder 23 on the roller cutter 12 which means that the sealing means 21 is retained in the groove 22 by snap action. The main body of the sealing means 21 comprises an annular plate or disk 24 of spring steel which is vulcanized to the main body. The plate 24 which extends substantially radially gives the sealing means 21 the required stability, thereby ensuring that the sealing means is retained in the groove 22. Instead of being metallic the annular stabilizing means of course can be made of some other stiff material, such as plastics.

According to the invention the primary sealing function between the roller cutter 12 and the bit head, i.e. the leg 10, is maintained by means of an elastically yieldable lip or tongue 25. The tongue 25 extends axially and radially outwards relative to the rotational axis 26 of the roller cutter from its radially inner end which is attached to the main body of the sealing means to its outer free end. The length of the tongue 25 substantially exceeds the thickness T. Due to the fact that it is weak and elastic the tongue 25 allows both radial and axial movements of the roller cutter 12 relative to the leg 10 without causing a remarkable pressure increase at the contact surface between the tongue 25 and the leg 10. The low contact pressure keeps the heat generation at a low level which results in a slow wear and thus a long life of the sealing means. Due to the fact that the tongue 25 is directed radially outwards the sealing means has a check valve function, i.e. the higher the pressure is acting in the chamber 20 and thus the higher the risk is for impurities to enter the bearing system, the safer the tongue 25 is biased against the leg 10.

In the illustrated embodiment the tongue 25 is attached to the main body of the sealing means at its radially inner end. The main object of the invention, i.e. to avoid that axial and wobbling movements of the roller cutter relative to the bit head will cause rapid wear of the tongue 25, will, however, probably be attained also if the tongue 25 is attached to the main body of the sealing means at its radially outer end. In this case, thus, the tongue 25 extends radially inwards relative to the rotational axis 26 from its outer end to its inner free end.

If the tongue 25 is prevented from springing backwards toward the main body of the sealing means high forces arise between the tongue 25 and the leg 10, thereby causing rapid wear of the tongue 25.

According to the invention it is ensured that impurities, such as drill dust, are removed continuously from the space between the tongue 25 and the main body of the sealing means in order to make possible this yielding or springing movement of the tongue 25. To this end a flushing channel 27 is provided in the leg 10. The channel 27 communicates with a channel 28 which extends in the longitudinal direction of the leg 10. Flushing fluid, such as compressed air, is conducted through the channels 27, 28 from a central bore in the upper part of the bit head, preferably via a check valve of the type illustrated in Swedish patent specification No. 7706028-3.

Figure 3:
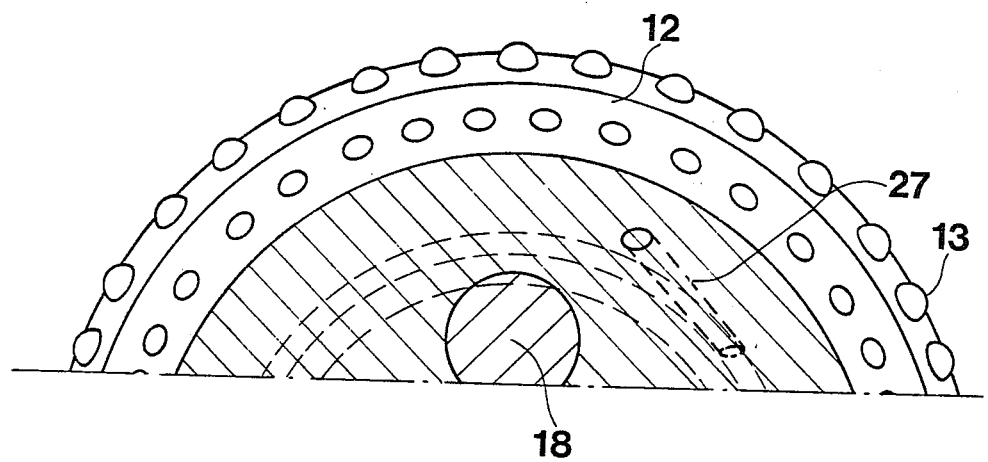
FIG. 3 is a section taken on the line III—III in FIG. 1.

According to the invention the channel 27 is directed tangentially relative to the annular gap 19, FIG. 3, and in a direction which is opposite to the rotational direction of the roller cutter 12. As may be seen in FIG. 1, the channel 27 extends also radially inwards and in the axial direction of the roller cutter 12. During its rotation, thus, the tongue 25 continuously will meet a flushing fluid flow from the channel 27, which means that driling dust is prevented from being collected behind the tongue 25. The flushing air flow has merely the purpose of eliminating destruction of the tongue 25 by continuous clearing thereof, and thus not the purpose of providing an air barrier during its overflow through the gap 19; i.e., the air itself has no primary sealing effect.

According to the invention the sealing means 21 is also provided with a secondary sealing function, in form of a free-space type seal 29, such as a labyrinth seal. The free-space type seal 29 is disposed radially inwardly of the tongue 25 for stopping particles which may have passed the tongue 25. The free-space type seal 29 is not completely leak-proof but works as an emergency seal if the lip seal 25 is damaged.

The space in the chamber 20 between the free-space type seal 29 and the tongue 25 is preferably filled with grease in which the particles that may pass the tongue 25 get stuck.

This space in the chamber 20 also provides a lubricant reservoir, thereby ensuring that the contact surface of the lip 25 against the leg 10 in efficiently lubricated.

According to the preferred embodiment the sealing means 21 is attached to the roller cutter 12. It might, however, be possible to benefit from the advantages of the invention also if the sealing means is attached to the leg 10.

In the illustrated embodiment the channel 27 is directed radially inwards. The essence, however, is that the channel 27 is directed tangentially relative to the chamber 20. The channel 28 may be prolonged, preferably to the pin 18, which means that the channel 27 becomes directed radially outwards toward the chamber 20. In this case, preferably, the tongue 25 extends radially inwards.

Figure 4:
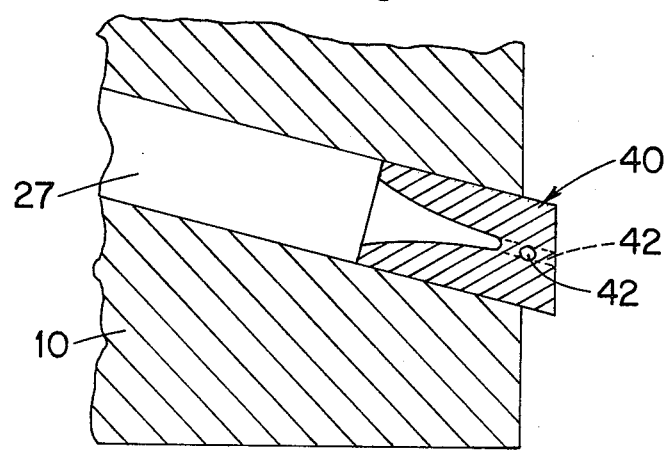
FIG. 4 is a fragmentary sectional view through the head depicting a nozzle at the end of the channel 27 which divides the outlet flow.

In the illustrated embodiment, the channel 27 is directed tangentially relative to the chamber 20. This means that the roller bit shold be rotated in a direction opposite to the flushing fluid flow. In order to make possible a rotation of the roller bit in both directions without affecting the flushing function, a nozzle 40 (FIG. 4) can be inserted in the mouth of the channel 27. Such a nozzle should be provided with two openings which are oppositely directed in the chamber 20. The flushing fluid flow through the channel 27, then, is devided into two oppositely directed tangential flows in the chamber 20.

Although being described in connection with a sealing means having a resilient tongue it is believed that the improved method of removing impurities from the portion of the gap 19 located between the tongue 25 and the opening of the gap by generating a tangential flushing flow in this portion to advantage could be used in connection with conventional type of sealing means.

We claim:

1. A rotary roller bit comprising a head having a bearing shaft, at least one roller cutter, said roller cutting being rotatably carried on said bearing shaft over bearing means and having an annular sealing means, said annular sealing means being disposed in an annular gap between said head and roller cutter for sealing said bearing means, characterized in that said sealing means comprises a main body and an elastically yieldable tongue firmly attached to said main body of the sealing means, said tongue being formed of a nonmetallic elastic material and having a length substantially exceeding its thickness, said tongue extending from said main body in a direction having a radial component relative to the rotational axis of the roller cutter so that its free end is radially spaced from its end being attached to the main body of the sealing means, thereby causing axial or wobbling movements of the roller cutter relative to the head to be taken up mainly by the yielding movement of tongue relative to the main body.

2. A roller bit according to claim 1, wherein the tongue has an axial and radial extension.

3. A roller bit according to claim 1, wherein the main body of the sealing means comprises a stabilizing means, preferably made of metal or plastics, and wherein the tongue consists of merely elastomeric material.

4. A roller bit according to claim 1, wherein the main body of the sealing means is connected to one of the mutually rotatable head and roller cutter, the yieldable tongue is adapted to provide a first dynamic seal against the other of the mutually rotatable members, and the sealing means is provided with a second dynamic seal which is of the free-spaced type.

5. A roller bit according to claim 4, wherein the sealing means is connected to either of the head and the roller cutter at its radially outer end.

6. A roller bit according to claim 5, wherein the sealing means is adapted to be secured in an annular groove in the roller cutter by snap action.

7. A roller bit according to claim 6, wherein the second dynamic seal is disposed radially inwardly of the sealing surface of the yieldable tongue.

8. A roller bit according to claim 7, wherein the second dynamic seal seals against a surface of the head or bearing shaft being transverse relative to a surface on the head or bearing shaft against which the tongue seals.

9. A roller bit according to claim 1, wherein said main body engages said roller cutter and said head at radially spaced locations, said main body being connected to one of said cutter and head and axially movable relative to the other of said cutter and head, said tongue extending from said main body in a direction having radial and axial components and engaging said other of said head and body at a location radially outwardly of the location where said main body contacts said other of said head and body, so as to be swingable toward and away from said main body in response to wobbling and axial movement of the cutter.

10. A roller bit according to claim 1 including removing means for removing impurities from the portion of said gap located radially outwardly of said sealing means, said removing means comprising at least one flushing channel which terminates in said gap, said flushing channel being arranged to produce a tangential flushing flow in said gap.

11. A rotary roller bit comprising a head, at least one roller cutter, said roller cutter being rotatably carried on a bearing shaft over bearing means and an annular sealing means, said annular sealing means being disposed in an annular gap between said head and roller cutter for sealing said bearing means, characterized in that said sealing means comprises an elastically yieldable tongue, said tongue being firmly attached to the main body of the sealing means and having a radial extension relative to the rotational axis of the roller cutter so that its free end is radially spaced from its end being attached to the main body of the sealing means, thereby causing axial or wobbling movements of the roller cutter relative to the head to be taken up mainly by the yielding movement of the tongue relative to the main body, the main body of the sealing means is connected to one of the mutually rotatable head and roller cutter, the yieldable tongue being adapted to provide a first dynamic seal against the other of the mutually rotatable members, and the sealing means is provided with a second dynamic seal which is of the free-spaced type.

12. A rotary roller bit comprising a head, at least one roller cutter, said roller cutter being rotatably carried on a bearing shaft over bearing means and an annular sealing means, said annular sealing means being disposed in an annular gap between said head and roller cutter for sealing said bearing means, characterized in that said sealing means comprises an elastically yieldable tongue, said tongue being firmly attached to the main body of the sealing means and having a radial extension relative to the rotational axis of the roller cutter so that its free end is radially spaced from its end being attached to the main body of the sealing means, thereby causing axial or wobbling movements of the roller cutter relative to the head to be taken up mainly by the yielding movement of the tongue relative to the main body, the flushing channel having a direction such that its intersects a plane passing through the rotational axis of the roller cutter, thereby producing the tangential flushing flow.

13. A roller bit according to claim 12, wherein the tangential flushing flow is directed in opposed direction to the rotational direction of the roller cutter.

14. A rotary roller bit comprising a head, at least one roller cutter, said roller cutter being rotatably carried on a bearing shaft over bearing means, and an annular sealing means, said annular sealing means being disposed in an annular gap between said head and roller cutter for sealing said bearing means, characterized in that said sealing means comprises an elastically yieldable tongue, said tongue being firmly attached to the main body of the sealing means and having a radial extension relative to the rotational axis of the roller cutter so that its free end is radially spaced from its end being attached to the main body of the sealing means, thereby causing axial or wobbling movements of the roller cutter relative to the head to be taken up mainly by the yielding movement of the tongue relative to the main body, the removing means further comprising a nozzle means which is mounted in the mouth of the flushing channel, said nozzle means being adapted to produce the tangential flushing flow.

15. A roller bit according to claim 14, wherein the nozzle means is adapted to divide the flushing flow into two oppositely directed tangential flows in the gap.

* * * * *